(No Model.)
C. D. EAMES.
TONGS.
No. 601,506. Patented Mar. 29, 1898.
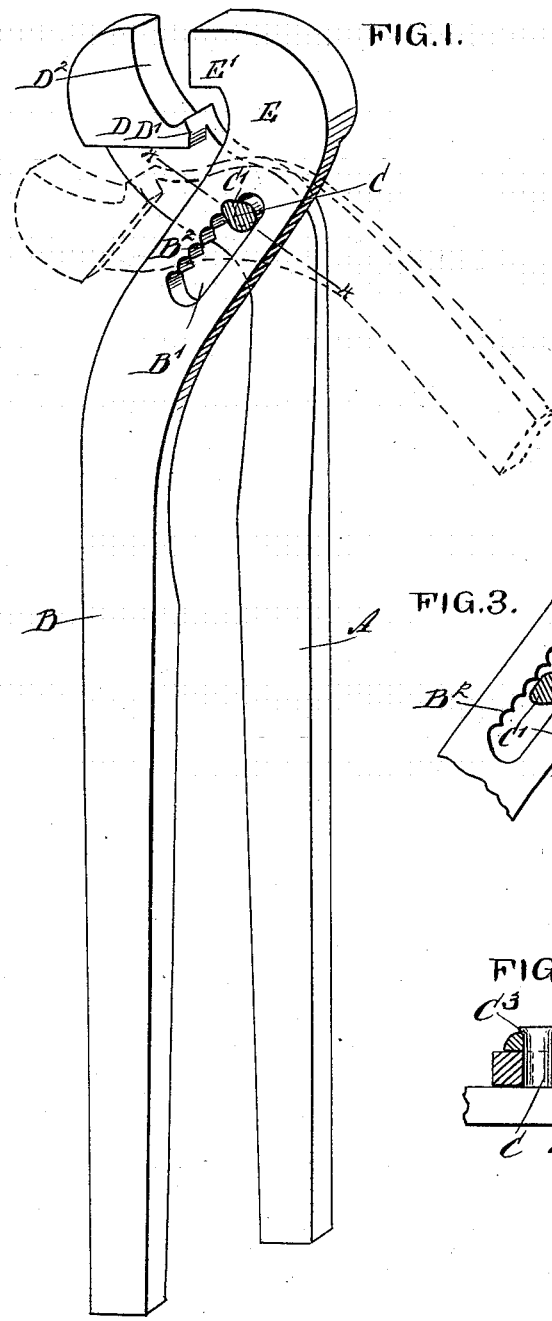
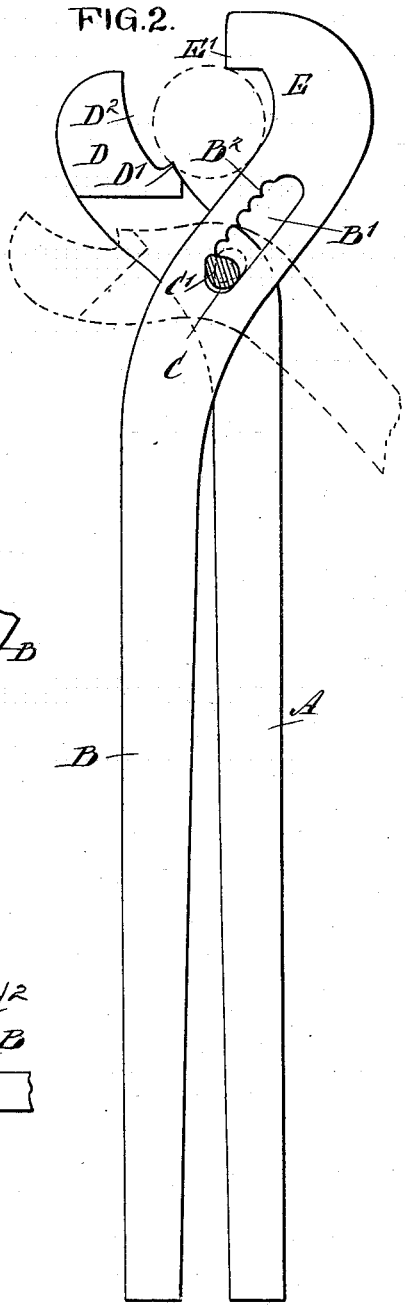
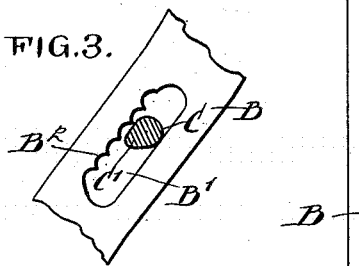
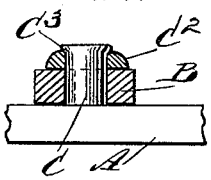
WITNESSES:
INVENTOR
C. D. Eames.
BY
ATTORNEYS.

UNITED STATES PATENT OFFICE.

CANLY D. EAMES, OF WORCESTER, MASSACHUSETTS.

TONGS.

SPECIFICATION forming part of Letters Patent No. 601,506, dated March 29, 1898.

Application filed August 4, 1897. Serial No. 647,111. (No model.)

*To all whom it may concern:*

Be it known that I, CANLY D. EAMES, of Worcester, in the county of Worcester and State of Massachusetts, have invented new and Improved Tongs, of which the following is a full, clear, and exact description.

The object of the invention is to provide new and improved tongs arranged with a changeable fulcrum to permit the operator to give a fine adjustment to the peculiarly-formed jaws to cause the latter to properly grip small or large objects, the operator being required to use but one hand in manipulating the lever-handles to open or close the jaws.

The invention consists of lever-handles carrying jaws, one of the handles having a rigid pivot provided with a laterally-projecting portion and entering a slot in the other handle, said slot being formed with recesses in one of its walls adapted to be engaged by the laterally-projecting portion of the pivot.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a perspective view of the improvement with the pivot in section. Fig. 2 is a side elevation of the same with the pivot in section and in a different position. Fig. 3 is a side elevation of part of the lever-handles with the pivot in position for adjusting the lever-handles one upon the other, and Fig. 4 is a cross-section of the improvement on the line 4 4 of Fig. 1.

The improved tool is provided with the lever-handles A and B, of which the lever-handle A carries a pivot C, having a laterally-projecting portion C', as is plainly shown in the drawings, the said pivot extending into an elongated slot B', formed in the handle-lever B.

On one wall of the slot B' are formed recesses B², adapted to be engaged by the laterally-projecting portion C' of the pivot C when it is desired to swing the handles to open and close the jaws. When moving the handles A and B, however, very far apart to bring the portion C' of the pivot C out of engagement with the recess B², as shown in Fig. 3, so that the laterally-projecting portion of the pivot extends likewise in the elongated slot, then the two lever-handles can be shifted one upon the other to engage the laterally-projecting portion C' of the pivot C with another of the recesses B², which latter takes place when the lever-handles are again moved into a closed position.

The lever-handles A and B are provided with jaws D E, respectively, of which the jaw D is formed near its inner end with a shoulder D', having a transversely-extending sharp edge adapted to engage and embed itself in the pipe or other article to be grasped. The other jaw E is formed on its outer end with a transverse lip E' for engaging the part opposite to that engaged by the edge of the shoulder D', as is plainly indicated in Fig. 2, so that when the lever-handles are closed the jaws firmly grasp the object for turning or otherwise manipulating the same.

By reference to Figs. 1 and 2 it will be seen that the inner face D² of the forward portion of the jaw D is curved outwardly from the shoulder D', so that it requires the wide opening of the levers A and B to open the jaws E and D sufficiently to admit or release the object to be grasped and at the same time, however, allow the jaws to firmly grasp the article between the sharp edge of the shoulder D' and the lip E', as above explained.

Now by the arrangement described the operator is enabled to readily adjust the lever-handles one upon the other to move the jaws nearer together or farther apart for grasping small or large objects, as the case may be, at the same time enabling the operator to manipulate the handle-levers with but one hand, for opening or closing the jaws, for the purpose mentioned.

On the outer end of the pivot C is preferably arranged a washer C², held in place by forming the pivot with a head C³, as is plainly indicated in Fig. 4, so that the two handle-levers cannot come apart after being once connected by the pivot, as above described.

It is expressly understood that the pivot C is not liable to accidentally leave the recess B² it is in at the time so long as the handle-levers are simply manipulated for opening and closing the jaws to receive or release the object, and the pivot only becomes disconnected when the lever-handles are swung far apart. The slot B' is arranged in the bent part between the jaw E and the lever-handle B, so that the slot extends at angles to the lever-handle B. The pivot C is likewise on the bent portion of the lever-handle A and extends with its laterally-projecting portion normally at angles to its lever-handle and at right angles to the slot B', as plainly indicated in Figs. 1 and 2.

Having thus fully described my invention, I claim as new and desire to secure by Letters Patent—

1. Tongs, comprising lever-handles carrying jaws, one of the handles being provided with a rigid pivot having a laterally-projecting portion, and the other with a slot having recesses in one of its walls, substantially as described.

2. Tongs, comprising bent lever-handles carrying jaws, one of the handles being provided with a slot in its bent portion and having recesses in one of its walls, and the other with a rigid pivot on its bent portion, said pivot having a laterally-projecting portion, which is normally at right angles to the said slot, substantially as described.

3. Tongs, provided with lever-handles pivotally connected with each other and formed with jaws, one of which is formed near its inner end with a shoulder having a laterally-extending sharp edge, the inner face of the outer end of this jaw being curved outwardly from the said shoulder, the other jaw being provided at its outer end with a transverse retaining-lip for the article to be grasped, substantially as shown and described.

CANLY D. EAMES.

Witnesses:
HOLLIS W. COBB,
FRANK B. HALL.